(12) United States Patent
Xiang

(10) Patent No.: US 9,281,705 B2
(45) Date of Patent: Mar. 8, 2016

(54) ELECTRONIC CIGARETTE CASE AND METHOD FOR CHARGING AN ELECTRONIC CIGARETTE THROUGH IT

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 225 days.

(21) Appl. No.: 13/968,136

(22) Filed: Aug. 15, 2013

(65) Prior Publication Data

US 2015/0002076 A1    Jan. 1, 2015

(30) Foreign Application Priority Data

Jun. 28, 2013   (CN) .......................... 2013 1 0268235

(51) Int. Cl.
*H02J 7/00* (2006.01)
(52) U.S. Cl.
CPC ..................................... *H02J 7/007* (2013.01)
(58) Field of Classification Search
CPC ....................................................... H02J 7/007

USPC .......................................................... 329/107
See application file for complete search history.

(56) References Cited

U.S. PATENT DOCUMENTS

2011/0316954 A1*  12/2011  Komatsu ........................ 347/171

\* cited by examiner

*Primary Examiner* — Thuan Do
(74) *Attorney, Agent, or Firm* — Locke Lord LLP; Tim Tingkang Xia, Esq.

(57) ABSTRACT

An electronic cigarette case and a method for charging an electronic cigarette through it are provided. The electronic cigarette case comprises a case body having a charging interface, it further comprises a controller, a trigger switch, a charging detection module and an electronic cigarette charging output module, the trigger switch is set close to the charging interface and will be triggered when the electronic cigarette has been inserted into the charging interface, in case the controller has found out that the trigger switch has been triggered, it will control the electronic cigarette charging output module to enter a charging mode; in case the charging detection module has found out that the electronic cigarette has been fully charged, the controller will control the electronic cigarette charging output module to enter an ultra low standby mode.

10 Claims, 4 Drawing Sheets

S300
a trigger switch set close to the charging interface will be triggered when an electronic cigarette has been inserted into the charging interface, the electronic cigarette case will enter a charging mode in which a charging current will be generated and output to the electronic cigarette to charge the electronic cigarette inserted S301
when the electronic cigarette has been fully charged, the electronic cigarette case will enter an ultra low standby mode in which the charging current will be stopped generating, thus making the standby current in the electronic cigarette case lower than 10mA

ELECTRONIC CIGARETTE CASE AND METHOD FOR CHARGING AN ELECTRONIC CIGARETTE THROUGH IT

CROSS-REFERENCE TO RELATED APPLICATIONS

This non-provisional application claims priority under 35 U.S.C. §119(a) on Patent Application No. 201310268235.4 filed in P.R. China on Jun. 28, 2013, the entire contents of which are hereby incorporated by reference.

FIELD OF THE INVENTION

The present invention related to the field of electronic cigarette, and more particularly, to an electronic cigarette case and a method for charging an electronic cigarette through it.

BACKGROUND OF THE INVENTION

At present, the products of electronic cigarette case have been widely used, not only because they are convenient to be taken along and able to accommodate electronic cigarettes, but also because their built-in reserve batteries can be used to charge the electronic cigarettes when the batteries in the electronic cigarettes have been fully drained.

However, after the electronic cigarette has been inserted into the charging interface of the electronic cigarette case to be charged, as long as the electronic cigarette has not been pulled out, the present electronic cigarette case will keep a high standby current such as from hundreds of microamps to several milliamperes, even if the electronic cigarette has been fully charged. For example, in a charging method, the electronic cigarette case will keep charging the electronic cigarette as long as the electronic cigarette has not been pulled out, so the standby current in the electronic cigarette case is still high (for example several milliamperes) even if the electronic cigarette has been fully charged. In another case, the processor in the electronic cigarette case should determine whether the electronic cigarette has been inserted through inquiring the port voltage on the charging interface discontinuously, the inquiring process will not be stopped even if the electronic cigarette has been fully charged, as a result the static current in the electronic cigarette case is high (for example hundreds of microamps). As the standby current in the electronic cigarette case is high, the electronic cigarette case will be out of power after a long time, which will bring inconvenience to users and will shorten the service life of the built-in battery of the electronic cigarette case as it may be charged frequently.

SUMMARY OF THE INVENTION

The object of the present invention is to provide an electronic cigarette case and a method for charging an electronic cigarette through the electronic cigarette case, which consumes little standby power, aiming at the drawback that the electronic cigarette case in the prior art consumes much standby power.

The technical schemes to solve the above technical problems are as follows.

An electronic cigarette case is provided, comprising a case body for accommodating electronic cigarettes, the case body having a charging interface for accepting an electronic cigarette when charging the electronic cigarette, the electronic cigarette case further comprises a controller, a trigger switch, a charging detection module and an electronic cigarette charging output module, the trigger switch, the charging detection module and the electronic cigarette charging output module are connected to the controller, the trigger switch is set close to the charging interface and will be triggered when the electronic cigarette has been inserted into the charging interface, in case the controller has found out that the trigger switch has been triggered, it will control the electronic cigarette charging output module to enter a charging mode in which the electronic cigarette charging output module will generate a charging current and output the charging current to the electronic cigarette to charge the electronic cigarette inserted; in case the charging detection module has found out that the electronic cigarette has been fully charged, the controller will control the electronic cigarette charging output module to enter an ultra low standby mode in which the electronic cigarette charging output module will stop generating the charging current to make the standby current in the electronic cigarette case lower than 10 mA.

In the electronic cigarette case of the present invention, the trigger switch comprises an elastic button set close to the charging interface and a signal generator communicated to the elastic button, the elastic button will be pressed by the electronic cigarette to start up the signal generator to generate an inserting signal when the electronic cigarette has been inserted into the charging interface.

In the electronic cigarette case of the present invention, the signal generator comprises an eleventh resistor, a twelfth resistor, a fifth capacitor, a sixth capacitor and a three-terminal-adjustable shunt reference source, the positive pole of the three-terminal-adjustable shunt reference source is connected to the controller, the negative pole of the three-terminal-adjustable shunt reference source is connected to a reference voltage via the twelfth resistor, the negative pole of the three-terminal-adjustable shunt reference source is also connected to a positive voltage, the reference pole of the three-terminal-adjustable shunt reference source is connected to the positive voltage too, the sixth capacitor is connected between the positive voltage and the ground; the elastic button is connected between the controller and a negative voltage, one end of the eleventh resistor is connected to the negative voltage via the elastic button, the other end of the eleventh resistor is connected to the reference voltage and connected to the ground via the fifth capacitor.

In the electronic cigarette case of the present invention, the trigger switch comprises a Holzer switch set close to the charging interface, the Holzer switch will generate an inserting signal when the electronic cigarette that has a magnet has been inserted into the charging interface.

In the electronic cigarette case of the present invention, the charging detection module comprises a charging current detection module operable to detect the charging current, the electronic cigarette will be determined to be fully charged if the charging current detected is lower than a preset current threshold.

In the electronic cigarette case of the present invention, the charging current detection module comprises a ninth resistor, a tenth resistor and a fourth capacitor, the tenth resistor is connected between the positive pole of the battery rod in the electronic cigarette and the ground, the ninth resistor is connected between the positive pole of the battery rod and the controller, the fourth capacitor is connected between the controller and the ground.

In the electronic cigarette case of the present invention, the charging detection module comprises a voltage detection module operable to detect the voltage of the electronic cigarette, the electronic cigarette will be determined to be fully charged if the voltage detected is higher than a preset voltage threshold.

In the electronic cigarette case of the present invention, the voltage detection module comprises a seventh resistor, a eighth resistor and a second capacitor, the seventh resistor and the eighth resistor are successively connected in series between the positive pole of the battery rod in the electronic cigarette and the ground, the common node of the seventh resistor and the eighth resistor is connected to the controller, the second capacitor is connected between the controller and the ground.

In the electronic cigarette case of the present invention, the controller comprises a chip HT46R01B, a third capacitor and a third diode, the third capacitor is connected between the reference voltage port of the HT46R01B and the ground, the positive pole of the third diode is connected to a reference voltage, the negative pole of the third diode is connected to the reference voltage port of the HT46R01B.

Accordingly, a method for charging an electronic cigarette through an electronic cigarette case is provided in the present invention, the electronic cigarette case comprising a case body for accommodating electronic cigarettes, the case body having a charging interface, wherein, the method comprises:

a trigger switch set close to the charging interface will be triggered when an electronic cigarette has been inserted into the charging interface, the electronic cigarette case will enter a charging mode in which a charging current will be generated and output to the electronic cigarette to charge the electronic cigarette inserted;

when the electronic cigarette has been fully charged, the electronic cigarette case will enter an ultra low standby mode in which the charging current will be stopped generating, thus making the standby current in the electronic cigarette case lower than 10 mA.

In the method of the present invention, the method for detecting whether the electronic cigarette has been fully charged comprises: detecting the amount of the charging current and determining that the electronic cigarette has been fully charged if the charging current detected is lower than a preset current threshold.

In the method of the present invention, the method for detecting whether the electronic cigarette has been fully charged comprises: detecting the amount of the voltage of the electronic cigarette and determining that the electronic cigarette has been fully charged if the voltage detected is higher than a preset voltage threshold.

The following beneficial effects will be achieved when implementing the embodiments of the present invention. The total standby current in the electronic cigarette case will be reduced to be lower than 10 mA through automatically being triggered into the charging mode when an electronic cigarette has been inserted, generating and outputting the charging current to charge the inserted electronic cigarette and stop generating the charging current after the electronic cigarette has been fully charged. The standby power in the electronic cigarette case will be cut down evidently, the charging times for the electronic cigarette case will be reduced, the service life of the built-in battery of the electronic cigarette case will be lengthened, and thus the user experience improved.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the objects, technical schemes and advantages more clearly, the present invention may be further described in detail with reference to the accompanying drawings and embodiments.

Figure 1:
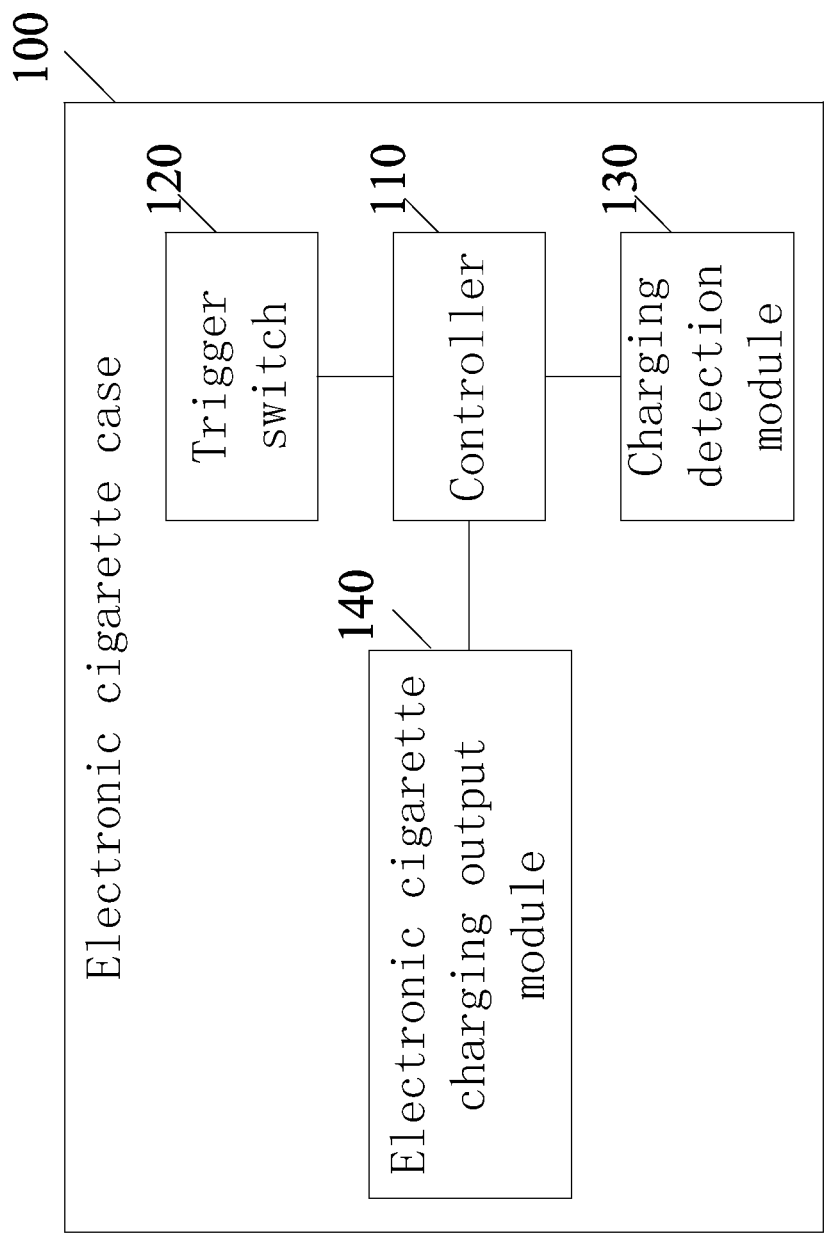
FIG. 1 is a diagram for an electronic cigarette case according to the present invention.

An electronic cigarette case usually comprises a case body for accommodating electronic cigarettes. The case body has a charging interface for accepting an electronic cigarette to enable the battery rod in the electronic cigarette communicate to the corresponding circuits in the case body, so that the electronic cigarette can be charged by the built-in battery of the electronic cigarette case. FIG. 1 shows a diagram for the corresponding circuits in the case body. Referring to FIG. 1, the electronic cigarette case 100 comprises a controller 110, a trigger switch 120, a charging detection module 130 and an electronic cigarette charging output module 140. The trigger switch 120 is set close to the charging interface and will be triggered when the electronic cigarette has been inserted into the charging interface. The trigger switch 120, the charging detection module 130 and the electronic cigarette charging output module 140 are respectively communicated to the controller 110. In case the controller 110 has found out that the trigger switch 120 connected to it has been triggered, it will control the electronic cigarette charging output module 140 to enter a charging mode in which the electronic cigarette charging output module 140 will generate a charging current and output the charging current to the electronic cigarette to charge the electronic cigarette inserted. In case the charging detection module 130 has found out that the electronic cigarette has been fully charged, the controller 110 will control the electronic cigarette charging output module 140 to enter an ultra low standby mode in which the electronic cigarette charging output module 140 will stop generating the charging current to make the standby current in the electronic cigarette case 100 lower than 10 mA.

Figure 3:
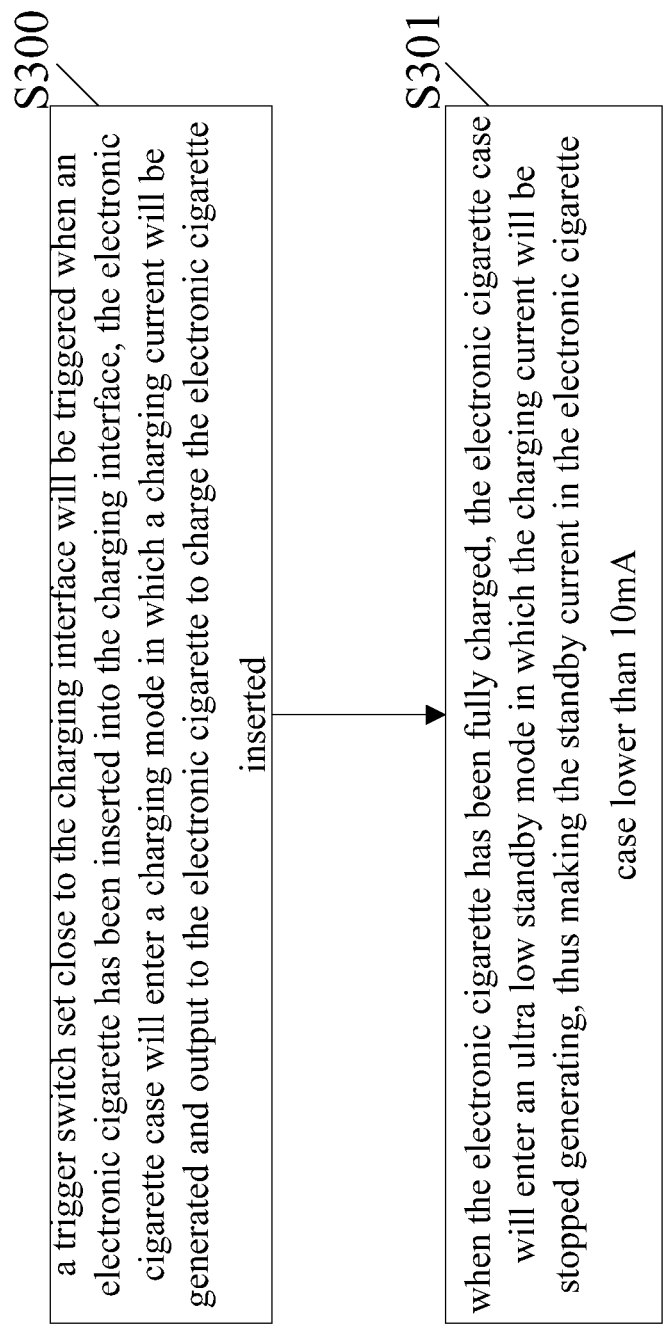
FIG. 3 is a flowchart for a method for charging the electronic cigarette through the electronic cigarette case shown in FIG. 1.

Referring to FIG. 3, which shows a method for charging an electronic cigarette through the electronic cigarette case 100 shown in FIG. 1, the method comprises:

S300. a trigger switch set close to the charging interface will be triggered when an electronic cigarette has been inserted into the charging interface, the electronic cigarette case will enter a charging mode in which a charging current will be generated and output to the electronic cigarette to charge the electronic cigarette inserted;

S301. when the electronic cigarette has been fully charged, the electronic cigarette case will enter an ultra low standby mode in which the charging current will be stopped generating, thus making the standby current in the electronic cigarette case lower than 10 mA.

In the electronic cigarette case and the method for charging the electronic cigarette through the electronic cigarette case provided in the present invention, the electronic cigarette case is automatically triggered into the charging mode when an electronic cigarette has been inserted, generates and outputs the charging current to charge the inserted electronic cigarette and stops generating the charging current after the electronic cigarette has been fully charged. The total standby current in the electronic cigarette case will be reduced to be lower than 10 mA. The standby power in the electronic cigarette case will be cut down evidently, the charging times for the electronic cigarette case will be reduced, the service life of the built-in battery of the electronic cigarette case will be lengthened, and thus the user experience improved.

As the electronic cigarette case in the present invention should be used along with the electronic cigarette, the structure of the electronic cigarette case will be different according to different electronic cigarettes in various embodiments.

Figure 4:
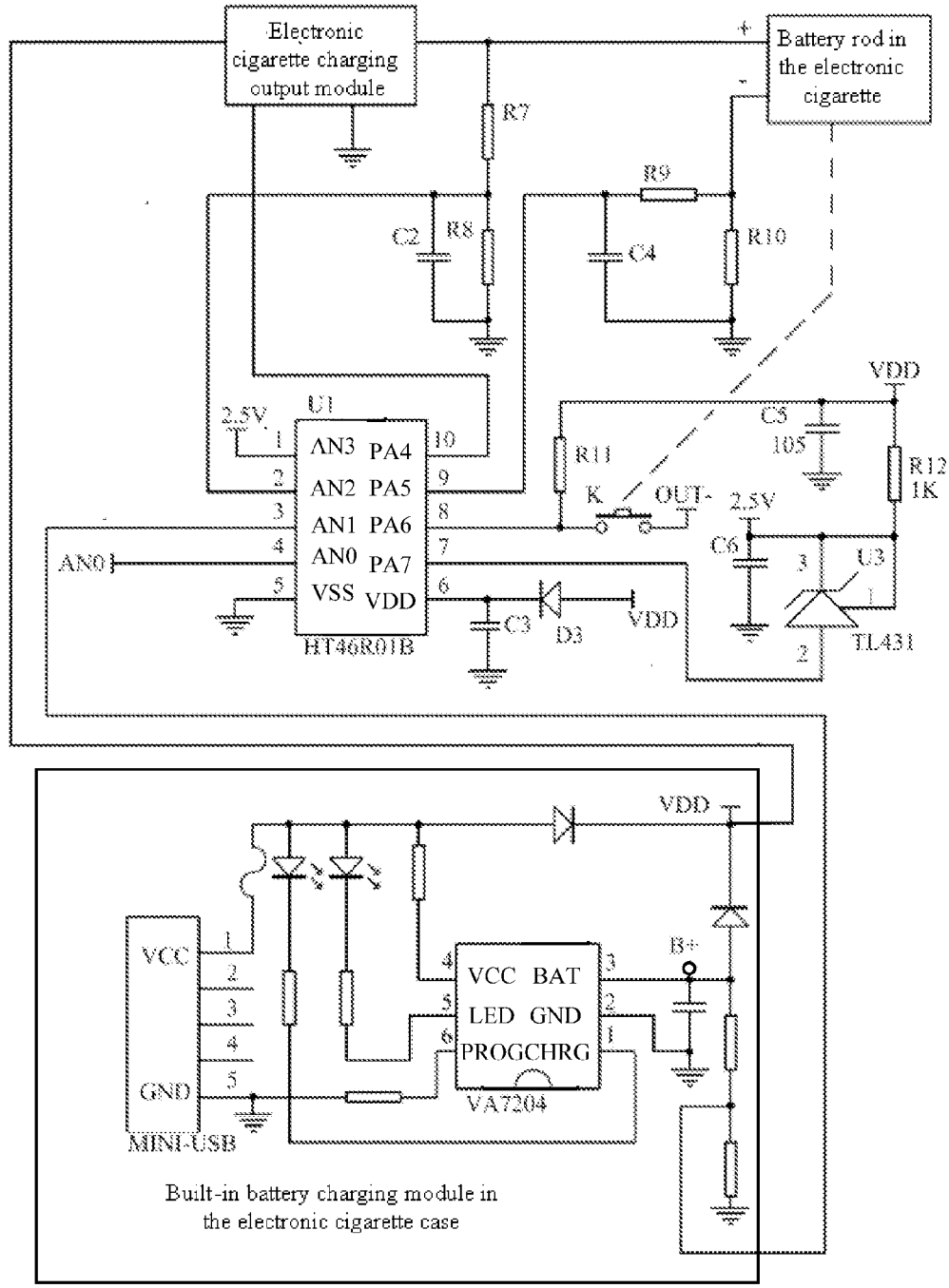
FIG. 4 is a circuit for the electronic cigarette case shown in FIG. 1 with an electronic cigarette charged.

For example, if the electronic cigarette is made of hard material, the trigger switch 120 may comprise an elastic button (the switch K in FIG. 4) set close to the charging interface and a signal generator (the circuit module consisted of an eleventh resistor R11, a twelfth resistor R12, a fifth capacitor C5, a sixth capacitor C6 and a three-terminal-adjustable shunt reference source U3 in FIG. 4) communicated to the elastic button. The elastic button will be pressed by the electronic cigarette to start up the signal generator to generate an inserting signal when the electronic cigarette has been inserted into the charging interface. Specifically, the elastic button may be a mechanical button such as a flexure strip or a spring. The elastic button protrudes near the charging interface in an original state if the electronic cigarette is not inserted into the charging interface. After the electronic cigarette has been inserted into the charging interface, the elastic button will be contacted with the electronic cigarette and be pressed by the electronic cigarette, namely it will stay in a pressed state, so as to start up the signal generator circuit connected to it. The skilled in the art should understand that the trigger switch 120 can generate a pulling-out signal when the electronic cigarette is being pulled out of the charging interface besides generating the inserting signal when the electronic cigarette is being inserted into the charging interface. Referring to FIG. 4, the three-terminal-adjustable shunt reference source U3 can be a TL431. The positive pole of the TL431 is connected to the port PA7 of the controller chip HT46R01B, the negative pole of the TL431 is connected to a reference voltage VDD via the R12, the negative pole of the TL431 is also connected to a 2.5V positive voltage, the reference pole of the TL431 is connected to the 2.5V positive voltage too, the C6 is connected between the 2.5V positive voltage and the ground. The elastic button K is connected between the port PA6 of the controller chip and a negative voltage OUT–, one end of the R11 is connected to the negative voltage OUT– via the elastic button K, the other end of the R11 is connected to the reference voltage VDD and also connected to the ground via the C5.

In another embodiment, the battery rod in the electronic cigarette has a magnet connecting structure, the trigger switch 120 comprises a Holzer switch set close to the charging interface, the Holzer switch will generate an inserting signal when the electronic cigarette that has a magnet has been inserted into the charging interface. Specifically, when the electronic cigarette is inserted into the charging interface, the magnet in it will change the magnetic field applied to the Holzer switch. Then the Holzer switch will sense the change based on the principle of Holzer effect and output the change in an analog signal or a digital signal. The skilled in the art should understand that the trigger switch 120 can generate a pulling-out signal when the electronic cigarette is being pulled out of the charging interface besides generating the inserting signal when the electronic cigarette is being inserted into the charging interface.

In another example, if the battery rod in the electronic cigarette is connected to a charging management circuit, the charging detection module 130 may comprise a charging current detection module operable to detect the charging current that the electronic cigarette charging output module 140 output to the electronic cigarette. The electronic cigarette will be determined to be fully charged if the charging current detected is lower than a preset current threshold. Preferably, the preset current threshold may be 20 mA. Specifically, if a charging management circuit is connected to the battery rod in the electronic cigarette, the charging management circuit will control the voltage of the electronic cigarette to keep constant and will reduce the charging current a lot to keep charging the battery rod when the electronic cigarette has been fully charged. As a result, the electronic cigarette can be determined to be fully charged if the charging detection module 130 has found out that the charging current is lower than the preset current threshold. Referring to FIG. 4, the charging current detection module may comprise a ninth resistor R9, a tenth resistor R10 and a fourth capacitor C4, the R10 is connected between the positive pole of the battery rod in the electronic cigarette and the ground, the R9 is connected between the positive pole of the battery rod and the port PA5 of the controller chip HT46R01B, the C4 is connected between the port PA5 of the controller chip and the ground.

In another example, if there isn't a charging management circuit connected to the battery rod in the electronic cigarette, the charging detection module 130 may comprise a voltage detection module operable to detect the voltage of the electronic cigarette. The electronic cigarette will be determined to be fully charged if the voltage detected is higher than a preset voltage threshold. Preferably, the preset voltage threshold may be 4.2V. Specifically, if there isn't a charging management circuit connected to the battery rod, the electronic cigarette case will keep to output the charging current to the electronic cigarette to rise the voltage of the electronic cigarette even if the electronic cigarette has been fully charged. As a result, the electronic cigarette can be determined to be fully charged when the charging detection module 130 has found out that the voltage of the electronic cigarette is higher than the preset voltage threshold. Referring to FIG. 4, the voltage detection module comprises a seventh resistor R7, a eighth resistor R8 and a second capacitor C2, the R7 and the R8 are successively connected in series between the positive pole of the battery rod in the electronic cigarette and the ground, the common node of the R7 and the R8 is connected to the port AN2 of the controller chip HT46R01B, the C2 is connected between the port AN2 of the controller chip and the ground.

Referring to FIG. 4, the controller 110 may comprise a circuit module consisted of a chip U1, a third capacitor C3 and a third diode D3, wherein the chip U1 may be the HT46R01B. The C3 is connected between the reference voltage port VDD of the HT46R01B and the ground, the positive pole of the D3 is connected to a reference voltage VDD, the negative pole of the D3 is connected to the reference voltage port of the HT46R01B. Besides, the port PA4 of the HT46R01B is connected to the electronic cigarette charging output module 140, the port AN3 is connected to the 2.5V positive voltage, the port AN1 is connected to the built-in battery charging module in the electronic cigarette case to detect the voltage of the built-in battery in the electronic cigarette case.

Figure 2:
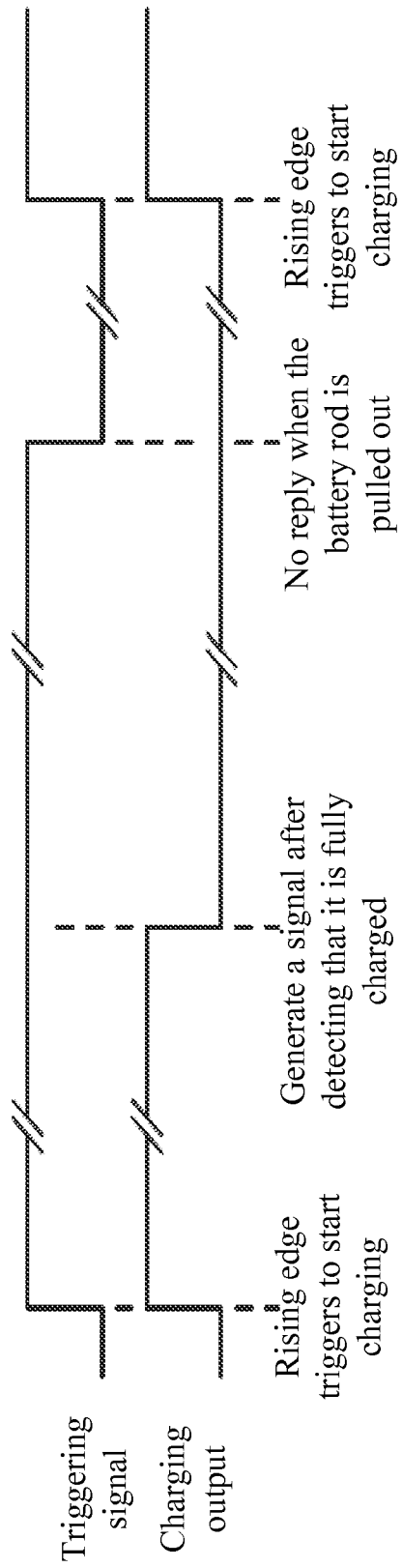
FIG. 2 is a diagram for the working process shows how dose the electronic cigarette case shown in FIG. 1 charge the electronic cigarette according to the present invention.

Referring to FIG. 2, which shows the working process of how dose the electronic cigarette case shown in FIG. 1 charge the electronic cigarette, the signals generated by the trigger switch 120, namely the inserting signal and the pulling-out signal, can be referred as the "triggering signal", the output of the electronic cigarette charging output module 140 can be referred as the "charging output", wherein the inserting signal has a high level and the pulling-out signal has a low level. The trigger switch 120 will generate the inserting signal with a high level when it is triggered by the electronic cigarette inserted into the charging interface, thus a rising edge appearing. The controller 110 is triggered by the rising edge to start up the electronic cigarette charging output module 140 to generate and output the charging current (the charging current is displayed as a high level in the digital circuit) to charge the electronic cigarette. The controller 110 will control the electronic cigarette charging output module 140 to stop generating the charging current (no current or little current is displayed as a low level in the digital circuit) when the charging detection module 130 has found out that the electronic cigarette has been fully charged, so that the electronic cigarette will no longer be charged. The trigger switch 120 will be rebounded to generate the pulling-out signal with a low level when the electronic cigarette has been pulled out of the charging interface. The above process will be repeated if there is an electronic cigarette inserted into the charging interface.

FIG. 2 shows a control method with digital signal which uses a pulse signal to control, which is illustrative but not limited. In other embodiments of the present invention, any other methods known by the skilled in the art can be adopted to perform the circuit control.

While the present invention has been described with reference to preferred embodiments, it will be understood by those skilled in the art that various changes and equivalents may be substituted without departing from the scope of the present invention, and those various changes and equivalents shall fall into the protection of the invention.

What is claimed is:

1. An electronic cigarette case comprising
a case body for accommodating electronic cigarettes, the case body having a charging interface for accepting an electronic cigarette when charging the electronic cigarette;
a controller;
a trigger switch;
a charging detection module; and
an electronic cigarette charging output module;
wherein, the trigger switch, the charging detection module and the electronic cigarette charging output module are connected to the controller;
the trigger switch is mounted structurally close to the charging interface, so that the trigger switch is capable of being automatically triggered by the electronic cigarette due to an insertion of the electronic cigarette into the charging interface;
in case the controller has found out that the trigger switch has been triggered, it will control the electronic cigarette charging output module to enter a charging mode in which the electronic cigarette charging output module will generate a charging current and output the charging current to the electronic cigarette to charge the electronic cigarette inserted; in case the charging detection module has found out that the electronic cigarette has been fully charged, the controller will control the electronic cigarette charging output module to enter an ultra low standby mode in which the electronic cigarette charging output module will stop generating the charging current to make the standby current in the electronic cigarette case lower than 10 mA.

2. The electronic cigarette case of claim 1, wherein, the trigger switch comprises an elastic button and a signal generator communicated to the elastic button; the elastic button is mounted structurally close to the charging interface, so that the elastic button is capable of being automatically pressed by the electronic cigarette when the electronic cigarette is inserted into the charging interface; the signal generator is capable of being started up to generate an inserting signal when the elastic button is pressed.

3. The electronic cigarette case of claim 1, wherein, the signal generator comprises an eleventh resistor, a twelfth resistor, a fifth capacitor, a sixth capacitor and a three-terminal-adjustable shunt reference source, the positive pole of the three-terminal-adjustable shunt reference source is connected to the controller, the negative pole of the three-terminal-adjustable shunt reference source is connected to a reference voltage via the twelfth resistor, the negative pole of the three-terminal-adjustable shunt reference source is also connected to a positive voltage, the reference pole of the three-terminal-adjustable shunt reference source is connected to the positive voltage too, the sixth capacitor is connected between the positive voltage and the ground; the elastic button is connected between the controller and a negative voltage, one end of the eleventh resistor is connected to the negative voltage via the elastic button, the other end of the eleventh resistor is connected to the reference voltage and connected to the ground via the fifth capacitor.

4. The electronic cigarette case of claim 1, wherein, the trigger switch comprises a Holzer switch mounted structurally close to the charging interface, so that the Holzer switch is capable of automatically generating an inserting signal when the electronic cigarette that has a magnet is inserted into the charging interface.

5. An electronic cigarette case comprising
a case body for accommodating electronic cigarettes, the case body having a charging interface for accepting an electronic cigarette when charging the electronic cigarette;
a controller;
a trigger switch;
a charging detection module; and
an electronic cigarette charging output module;
wherein, the trigger switch, the charging detection module and the electronic cigarette charging output module are connected to the controller, the trigger switch is set close to the charging interface and will be triggered when the electronic cigarette has been inserted into the charging interface, in case the controller has found out that the trigger switch has been triggered, it will control the electronic cigarette charging output module to enter a charging mode in which the electronic cigarette charging output module will generate a charging current and output the charging current to the electronic cigarette to charge the electronic cigarette inserted; in case the charging detection module has found out that the electronic cigarette has been fully charged, the controller will control the electronic cigarette charging output module to enter an ultra low standby mode in which the electronic cigarette charging output module will stop generating the charging current to make the standby current in the electronic cigarette case lower than 10 mA;
wherein, the charging detection module comprises a charging current detection module operable to detect the charging current, the electronic cigarette will be determined to be fully charged if the charging current detected is lower than a preset current threshold;
wherein, the charging current detection module comprises a ninth resistor, a tenth resistor and a fourth capacitor, the tenth resistor is connected between the positive pole of the battery rod in the electronic cigarette and the ground, the ninth resistor is connected between the positive pole of the battery rod and the controller, the fourth capacitor is connected between the controller and the ground.

6. An electronic cigarette case comprising
a case body for accommodating electronic cigarettes, the case body having a charging interface for accepting an electronic cigarette when charging the electronic cigarette;
a controller;
a trigger switch;
a charging detection module; and
an electronic cigarette charging output module;
wherein, the trigger switch, the charging detection module and the electronic cigarette charging output module are connected to the controller, the trigger switch is set close to the charging interface and will be triggered when the electronic cigarette has been inserted into the charging interface, in case the controller has found out that the trigger switch has been triggered, it will control the electronic cigarette charging output module to enter a charging mode in which the electronic cigarette charging output module will generate a charging current and output the charging current to the electronic cigarette to charge the electronic cigarette inserted; in case the charging detection module has found out that the electronic cigarette has been fully charged, the controller will control the electronic cigarette charging output module to enter an ultra low standby mode in which the electronic cigarette charging output module will stop generating the charging current to make the standby current in the electronic cigarette case lower than 10 mA;
wherein, the charging detection module comprises a voltage detection module operable to detect the voltage of the electronic cigarette, the electronic cigarette will be determined to be fully charged if the voltage detected is higher than a preset voltage threshold;
wherein, the voltage detection module comprises a seventh resistor, an eighth resistor and a second capacitor, the seventh resistor and the eighth resistor are successively connected in series between the positive pole of the battery rod in the electronic cigarette and the ground, the common node of the seventh resistor and the eighth resistor is connected to the controller, the second capacitor is connected between the controller and the ground.

7. An electronic cigarette case comprising
a case body for accommodating electronic cigarettes, the case body having a charging interface for accepting an electronic cigarette when charging the electronic cigarette;
a controller;
a trigger switch;
a charging detection module; and
an electronic cigarette charging output module;
wherein, the trigger switch, the charging detection module and the electronic cigarette charging output module are connected to the controller, the trigger switch is set close to the charging interface and will be triggered when the electronic cigarette has been inserted into the charging interface, in case the controller has found out that the trigger switch has been triggered, it will control the electronic cigarette charging output module to enter a charging mode in which the electronic cigarette charging output module will generate a charging current and output the charging current to the electronic cigarette to charge the electronic cigarette inserted; in case the charging detection module has found out that the electronic cigarette has been fully charged, the controller will control the electronic cigarette charging output module to enter an ultra low standby mode in which the electronic cigarette charging output module will stop generating the charging current to make the standby current in the electronic cigarette case lower than 10 mA;
wherein, the controller comprises a chip HT46R01B, a third capacitor and a third diode, the third capacitor is connected between the reference voltage port of the HT46R01B and the ground, the positive pole of the third diode is connected to a reference voltage, the negative pole of the third diode is connected to the reference voltage port of the HT46R01B.

8. A method for charging an electronic cigarette through an electronic cigarette case which comprises a case body for accommodating electronic cigarettes, the case body having a charging interface, wherein, the method comprises:
the electronic cigarette to be charged is inserted into the charging interface;
a trigger switch mounted structurally close to the charging interface is automatically triggered by the electronic cigarette due to an insertion of the electronic cigarette into the charging interface;
the electronic cigarette case enters a charging mode in which a charging current will be generated and output to the electronic cigarette to charge the electronic cigarette inserted;
when the electronic cigarette has been fully charged, the electronic cigarette case will enter an ultra low standby mode in which the charging current will be stopped generating, thus making the standby current in the electronic cigarette case lower than 10 mA.

9. The method of claim 8, wherein, the method for detecting whether the electronic cigarette has been fully charged comprises: detecting the amount of the charging current and determining that the electronic cigarette has been fully charged if the charging current detected is lower than a preset current threshold.

10. The method of claim 8, wherein, the method for detecting whether the electronic cigarette has been fully charged comprises: detecting the amount of the voltage of the electronic cigarette and determining that the electronic cigarette has been fully charged if the voltage detected is higher than a preset voltage threshold.

* * * * *